Sept. 13, 1938.  F. KRITZ  2,129,942
WINDSHIELD WIPER MECHANISM
Filed Jan. 14, 1935  2 Sheets-Sheet 1
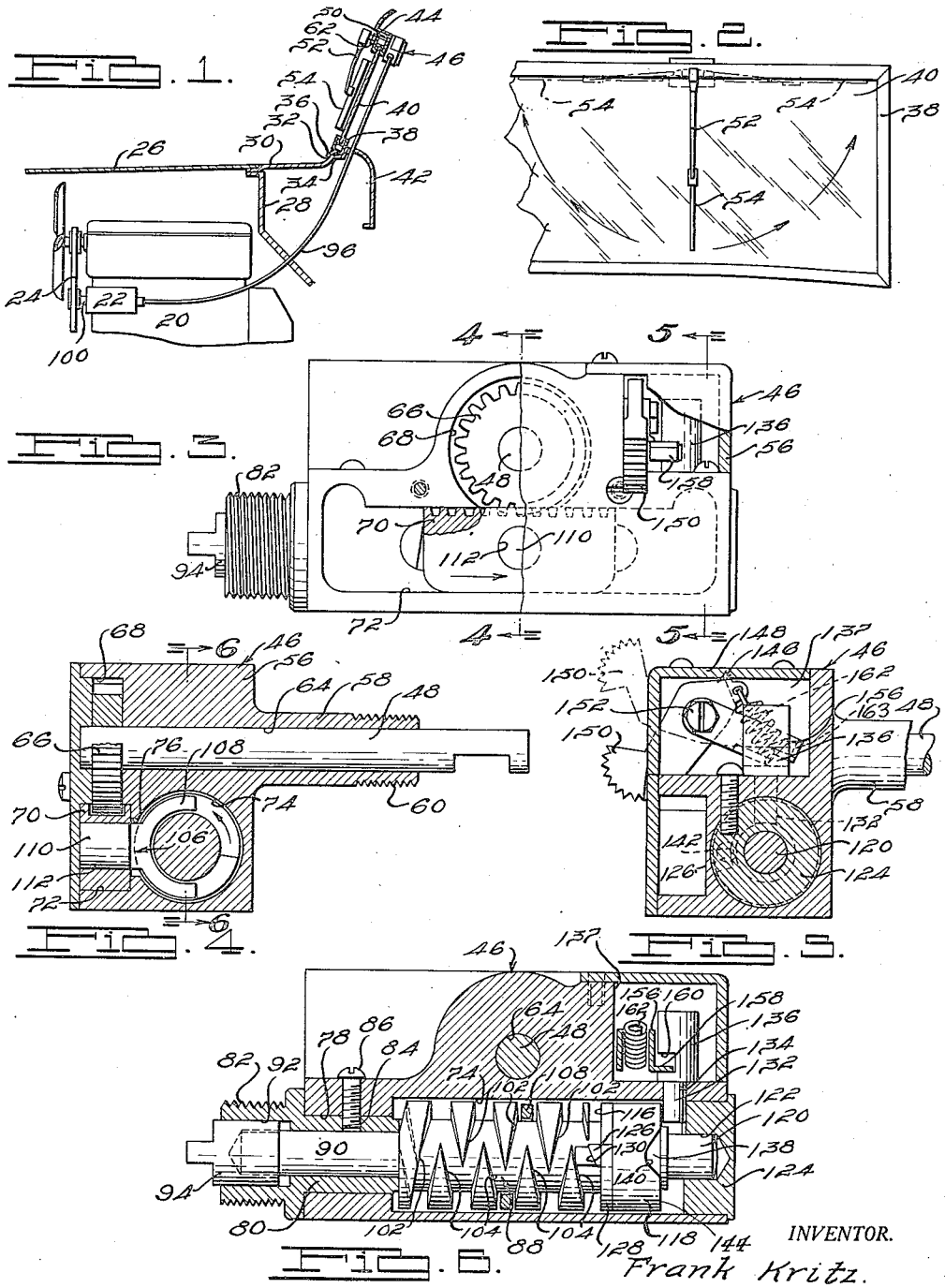
INVENTOR.
Frank Kritz.
BY
Harness, Dickey, Pierce & Hann.
ATTORNEYS.

Sept. 13, 1938.  F. KRITZ  2,129,942
WINDSHIELD WIPER MECHANISM
Filed Jan. 14, 1935   2 Sheets-Sheet 2
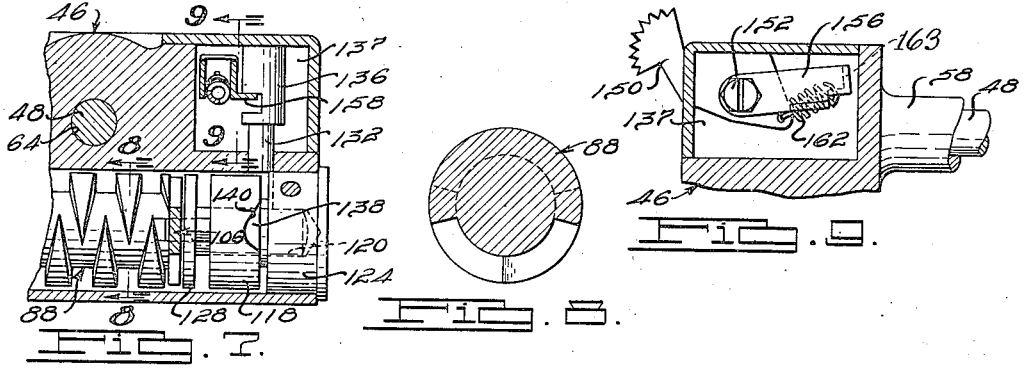
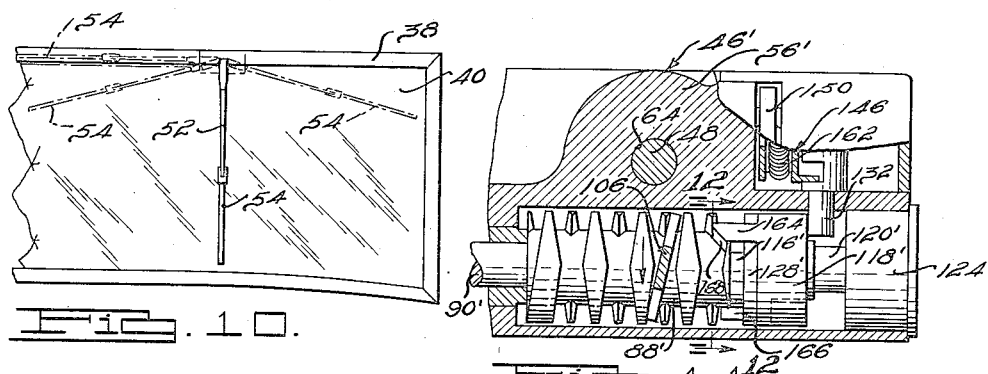
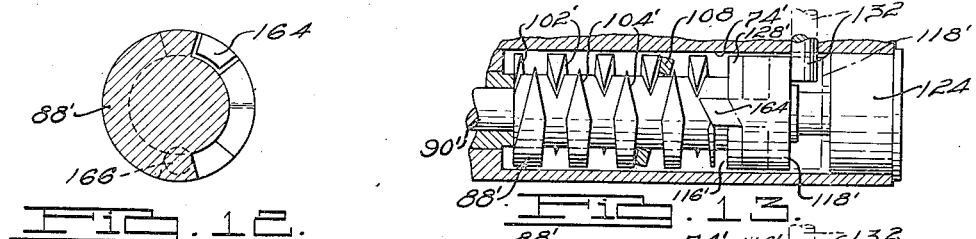
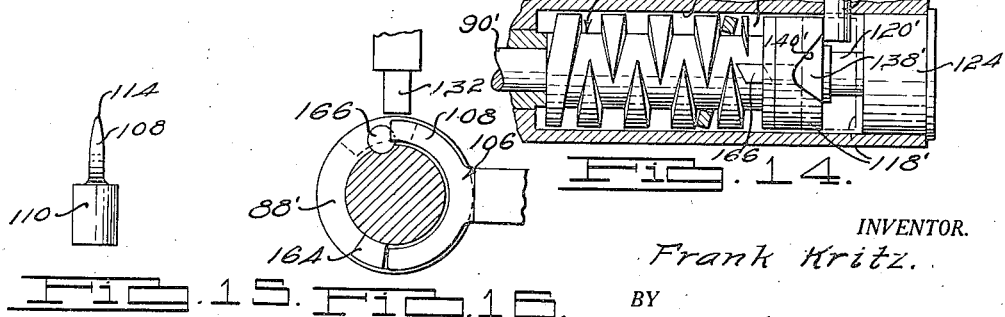
INVENTOR.
Frank Kritz.
BY
Harness, Dickey, Pierce & Hann.
ATTORNEYS.

Patented Sept. 13, 1938

2,129,942

UNITED STATES PATENT OFFICE 2,129,942

WINDSHIELD WIPER MECHANISM

Frank Kritz, Detroit, Mich.

Application January 14, 1935, Serial No. 1,594

10 Claims. (Cl. 15—255)

This invention relates to improved windshield wipers and particularly to that type thereof which is mechanically operable and adapted to derive its power from a rotating part of an internal combustion engine or any other rotative element, such, for instance, as a shaft of an electric or other motor.

One of the main objects of the invention is to provide, in a positive acting windshield wiper, a substantially self-contained, unitary and compact actuating unit which includes apparatus for oscillating a wiper blade as well as control mechanism for such apparatus.

Another object of the invention is to provide simple and inexpensive windshield wiping apparatus of this character which includes comparatively few parts of which the relatively moving parts are substantially silent in operation.

Another object of the invention is to provide an improved controllable power transmission mechanism for imparting oscillating movement to a driven member from a rotative driving member.

A further object of the invention is to provide mechanical windshield wiping apparatus which will oscillate a wiping element throughout a predetermined range of movement and which can be selectively conditioned to move the wiping element to, and maintain it in, a parked position beyond one of the limits of its normal range of movement.

A still further object of the invention is to provide servo-control mechanism which is operable by the actuating apparatus of a mechanically driven windshield wiper of this character for conditioning such apparatus to move the wiping element to and maintain it in a parked position.

An additional object of the invention is to provide snap-acting trigger means for initiating the operation of the parking control mechanism which requires but slight manual manipulation on the part of an operator in order to park the wiper blade or to bring it into operation.

Another object of the invention is to provide, in mechanically driven windshield wiping apparatus, blade parking mechanism of this type which will move the wiper blade to a parked position regardless of the position of the blade at the time the control trigger is actuated.

Further objects of the invention are to provide a driving shaft for a mechanically operable windshield wiper which has oppositely helixed threads that are so constructed and arranged as to reverse the movement of a follower during continuous rotation of the shaft in one direction when the follower reaches one limit of its course of movement; to provide a continuous groove on a shaft of this kind for accommodating rotation of the shaft while the follower remains at rest at the other limit of its course of movement; to provide means for selectively preventing the follower from gaining access to such groove and for causing a reversal in the direction of movement of the follower; to provide a wiper blade drive shaft of this character in mechanically driven windshield wiping mechanism which rotates continuously while the wiper blade is inoperative as well as operative; and to provide means for rendering the blade operative and inoperative respectively, which does not necessitate the coupling and uncoupling of clutch elements or similar wearing parts.

The above being among the objects of the present invention, the same consists in certain novel features of construction and combination of parts to be hereinafter described with reference to the accompanying drawings, and then claimed, having the above and other objects in view.

Illustrative embodiments of the invention are shown in the accompanying drawings, in which:

Fig. 1 is a more or less diagrammatic partially broken, fragmentary, vertical sectional view taken longitudinally through the center of a motor vehicle and particularly that part thereof including the engine and windshield and associated parts, and illustrating a windshield wiper mechanism constructed in accordance with the teachings of the present invention cooperatively associated with the windshield and deriving its power for operation from the engine.

Fig. 2 is a fragmentary front elevational view of the windshield and associated parts of the wiping mechanism shown in Fig. 1.

Fig. 3 is an enlarged rear face view of the combined actuating and control units of the windshield wiping mechanism illustrated in Fig. 1, the casing thereof being broken away and some of the parts of the mechanism being shown in sections.

Fig. 4 is a transverse, vertical sectional view taken on the line 4—4 of Fig. 3.

Fig. 5 is a transverse, vertical sectional view taken on the line 5—5 of Fig. 3.

Fig. 6 is a longitudinal sectional view taken on the line 6—6 of Fig. 4, showing certain details of the blade actuating mechanism and control apparatus therefor.

Fig. 7 is a fragmentary, longitudinal sectional view of the combined unitary windshield wiper actuating unit illustrated in Figs. 1 to 6, inclusive, and showing the parts thereof in positions corresponding to the parked position of the wiper blade.

Fig. 8 is a fragmentary, transverse, vertical sectional view taken on the line 8—8 of Fig. 7.

Fig. 9 is a fragmentary, transverse sectional view taken on the line 9—9 of Fig. 7.

Fig. 10 is a fragmentary, front elevational view of a windshield equipped with a mechanical wiper embodying a modified form of the invention.

Fig. 11 is a fragmentary, longitudinal sectional view of the actuating apparatus of the windshield wiping mechanism illustrated in Fig. 10.

Fig. 12 is a fragmentary, transverse sectional view taken on the line 12—12 of Fig. 11.

Fig. 13 is a fragmentary, longitudinal sectional view, similar to Fig. 11, but showing the threaded driving shaft and associated parts of the control apparatus of the latter figure in a rotated position.

Fig. 14 is a fragmentary, longitudinal sectional view, similar to Figs. 11 and 12, but showing the threaded driving shaft and associated parts of the control apparatus of the windshield wiping mechanism in a further rotated position.

Fig. 15 is a top plan view of the follower shown in Fig. 4, which is substantially identical to the follower employed in the form of the invention illustrated in Figs. 10 to 14, inclusive, and Fig. 16 is a transverse sectional view similar to Fig. 12 showing the relative positions of the follower of the mechanism and its releasable reversing member at the instant movement of the latter toward a reversing position is initiated.

Referring now to the drawings, and particularly to Fig. 1, there is indicated generally at 20 an internal combustion engine for a motor vehicle, the engine being provided with the usual electric generator 22 suitably driven from the crank shaft of the engine by means of a belt 24 in accordance with conventional practice. Over the engine 20 is positioned the usual hood 26, the rear edge of which rests upon the upper edge of the usual dash 28. Extending rearwardly from the dash 28 is the usual cowl 30, the upper rear edge of which is bent upwardly as at 32 and then rearwardly as at 34 to provide a shelf against which the usual sealing strip 36 positioned in the frame 38 of the windshield 40 may contact and seal the space between the windshield 40 and the cowl. Formed integral with the cowl 30, in the particular construction shown, is a rearwardly and downwardly extending panel 42 which provides the instrument panel, which, of course, is located within the driving compartment of the vehicle. The upper horizontal member of the windshield frame 38 is pivotally secured, by hinge means (not shown), to a transversely extending substantially horizontal body header structure 44.

In the form of the invention illustrated in Figs. 1 to 9, inclusive, the windshield wiping apparatus includes a unitary operating and control head, generally designated by the numeral 46 in Fig. 1, which is securable to the vehicle body in a suitable location, such, for instance, as to the interior of the side member of the windshield frame 38 and from which a wiper shaft extends forwardly through an aperture 50 formed in the upper horizontal member of the windshield frame 38. Operatively mounted on the external end of the wiper shaft 48 is a wiper arm 52 to which a wiping element or squeegee 54 is pivotally attached, the wiping element being resiliently urged against the exterior surface of the windshield 40 by the wiper arm 52 in a conventional manner.

The combined operating and control head 46 includes a casing preferably having a die cast body portion 56 provided with a forwardly extending tubular nipple 58 through which the wiper shaft 48 extends. The nipple 58 is receivable in the aperture 50 of the windshield frame and is provided on its external end with threads 60 for cooperating with a nut 62 by which the head 46 may, if desired, be detachably held in clamped relation upon the upper horizontal member of the windshield frame 38. A cylindrical bore 64, in which the shaft 48 is journaled, is formed in the nipple 58 and registering portions of the body part 56 of the housing of the header. Mounted on the inner end of the shaft 48 is a pinion 66 which is disposed in a recess 68 in the body portion 56 of the head 46. The teeth of the pinion 66 are meshed with corresponding teeth of a rack 70, which is slidably mounted in an elongated recess 72 formed in the die cast body portion of the head 46 and extending in a plane substantially normal to the axis of the wiper shaft 48. The rack 70 is shiftably mounted in the recess 72 and adapted to be reciprocated between predetermined limits of movement by actuating apparatus hereinafter described.

Formed in the die cast body portion 56 of the head 46 is a substantially cylindrical bore 74, which extends substantially parallel to the elongated recess 72, and which is located adjacent thereto and connected therewith by a passage 76 extending longitudinally of the recess 72 and bore 74. A substantially cylindrical bore 78 formed in the die cast portion 56 of the head communicates with the inner extremity of the bore 74 and is substantially co-axial therewith. The bore 78 is smaller in diameter than the bore 74 and it is adapted to receive a flanged bushing 80 having an external threaded portion 82 and provided with an aperture 84 for receiving a screw 86 by which it is releasably held in the head structure.

Rotatably mounted in the bore 74 is a driving shaft, generally designated by the numeral 88, which has a reduced portion 90 journaled in the bushing 80 and extending into a substantially cylindrical recess 92 formed in the external threaded portion 82 of the bushing. The external end portion of the reduced section 90 of the driving shaft 88 is adapted to receive a coupling 94 of a suitable flexible shaft 96 having one end portion operatively connected with the shaft 100 of the generator 22, or any other suitably rotated part of the engine 20 or other driving means.

Formed on that portion of the drive shaft 88 which is disposed in the cylindrical bore 74, are oppositely helixed threads between which correspondingly oppositely helixed grooves 102 and 104 are provided. A follower, generally designated by the numeral 106 in Fig. 4, provides an operative connection between the threaded portion of the driving shaft 88 and the reciprocable rack 70. This follower has a bifurcated end portion including arcuate prongs 108 which are engageable in the grooves 102 and 104 and which together extend throughout slightly more than 180 degrees of the circumference of the drive shaft. The follower 106 has a trunnion 110 which is oscillatively journaled in an aperture 112 formed in the reciprocable rack 70 and adapted to accommodate tilting of the follower to correspond with the opposite pitches of the grooves 102 and 104. The prongs 108 of the follower 106 are, as illustrated in Fig. 15, provided with relatively sharply tapered extremities 114 for facilitating the guiding of the follower throughout the course of movement defined by the helical grooves 102 and 104 and for assisting in the transfer of the prongs 108 from one of these grooves to the other.

The inner or left end portions of the grooves 102 and 104, as viewed in Fig. 6, are constructed, arranged and connected together in such a manner as to reverse the direction of movement of the follower when the latter reaches the inner extremity of the threaded portion of the drive shaft 88. During counter-clockwise rotation of the drive shaft 88, as viewed in Fig. 4, the prongs 108 are disposed in the groove 102, and the follower is moved to the right, as viewed in Fig. 6. During rotation of the drive shaft 88 in a counter-clockwise direction, as viewed in Fig. 4, and while the prongs 108 of the follower are disposed in the groove 104, the follower is moved to the left, as viewed in Fig. 6, until it reaches the inner extremity of the threaded portion of the drive shaft at which location it is tilted bodily about the axis of the trunnion 110 to bring its bifurcated end into an inclination corresponding with the pitch of the groove 102 by which it is again moved to the right, as viewed in Fig. 6.

Formed at the right end of the threaded portion of the drive shaft 88, as viewed in Fig. 6, is a continuous groove 116 which is disposed in a plane substantially normal to the axis of the driving shaft. When it is desired to park the wiper blade 54, the prongs 108 of the follower 106 are permitted to enter the groove 116 so as to allow continued rotation of the driving shaft 88 while the follower 106 remains at rest.

Provided in the outer end portion of the cylindrical bore 74 is means for selectively preventing and accommodating engagement of the prongs 108 in the groove 116. This mechanism includes a cylindrical plunger 118 shiftably mounted in the cylindrical bore 74 for axial movement with respect thereto and with respect to the drive shaft 88. The plunger 118 has an integral pilot member 120 slidably mounted in a bore 122 formed in a plug 124 which is fitted in the open end of the cylindrical bore 74, as illustrated in Fig. 6. Formed on the inner side of the plunger 118 is an inwardly extending projection 126 which passes through, and is slidably mounted in an aperture of a flange 128 provided on the outer end portion of the driving shaft 88. The projection 126 has a notch in its inner extremity which corresponds with the cross section of the adjacent turn of the groove 104 with which it registers when in its inner position. The projection 126 is also provided with a shoulder 130 that is engageable with the prongs 108 of the follower and adapted, when the projection is in its innermost position, as illustrated in Fig. 6, to prevent the prongs 108 of the follower from gaining access to the groove 116 and to direct such prongs from the groove 102 to the groove 104 so as to reverse the direction of movement of the follower when the latter reaches the left end of the driving shaft 88 as viewed in Fig. 6.

When the windshield wiping apparatus is in operation, the plunger 118 is normally held in its innermost position by engagement of its outer side with a pin 132 slidably mounted in an aperture 134 formed in the die cast body portion 56 of the head 46 and carried by a cylindrical member 136 disposed in a recess 137 formed in the upper right-hand corner portion of the die cast body part of the head 46, as viewed in Figs. 3 and 6.

The pin 132 is retractable from the bore 74 by control apparatus hereinafter described and when it is in the retracted position, illustrated in Fig. 7, the plunger 118 is free to move rightwardly from the position shown in Fig. 6 to the position shown in Fig. 7. This rightward movement of the plunger 118 is caused, when the pin 132 is withdrawn from the bore 74, by engagement of the leading prong 108 of the follower with the inclined shoulder 130 of the projection 126. The driving force of the drive shaft 88 thus serves to move the projection 126 to its retracted position and thereby admits access of the prongs of the follower 106 to the continuous groove 116 when the pin 132 is withdrawn from the bore 74. The follower is thus retained at rest and the wiper blade is maintained in a parked position at one end of its range of movement until the pin 132 is again inserted into the bore 74. This servo-action of the control apparatus eliminates the necessity of the application of manual force other than that required to manipulate the pin 132 in changing the windshield wiping apparatus from an operative to an inoperative state.

Provision is also made for movement of the plunger 118 and its projection 126 to the right, as viewed in Fig. 6, by the driving force of the drive shaft 88. This is accomplished by forming in the right end of the plunger 118 a relatively shallow recess 138 having a cam-shaped side wall 140. When the pin 132 is released from its retracted position, shown in Fig. 7, it rests upon the periphery of the plunger 118 until it is projected into the recess 138, during rotation of the plunger. During further rotation of the plunger 118, the wall 140 engages the side of the pin 132 and cams the plunger 118 to the left so as to bring the projection 126 into an operative position. While the pin 132 is disposed in the recess 138, it is held against movement to its fully extended position by engagement of the extremity of the pin with the bottom of the recess. After the recess rotates out of registration with the pin 132, the pin is free to move downwardly, as viewed in Fig. 6, to its fully extended position, in which it is in contact with at least a portion of the right end face 144 of the plunger 118 throughout each entire rotation of the latter. This operation eliminates the necessity of the application of manual force other than that required to manipulate the pin 132, in changing the windshield wiping apparatus from an inoperative to an operative state.

Movement of the pin 132 and the shiftable member 136, by which it is carried, is manually brought about by snap acting control apparatus, generally designated by the numeral 146 in Fig. 5, which is mainly confined in the recess 137 of the body portion 56 of the head 46 and partially concealed by an angular shaped cover plate 148 removably secured to the body portion of the head 46 by bolts, screws or other suitable means. The control apparatus 146 includes a trigger 150 which extends through a slot in the cover plate 148 and which is pivotally mounted intermediate its ends on the body portion of the head 46 by a bolt 152. Also pivotally mounted at its free ends on the bolt 152 is a U-shaped lever 156 having an outwardly struck lip or flange 158 which extends into a notch 160 formed in the side of the shiftable member 136. A coil spring 162 is attached at one end to the inner extremity of the trigger 150 and its other end is impaled on the inwardly struck lug or prong 163 at the closed or free end portion of the lever 156, as illustrated in Figs. 5 and 9, the spring 162 being maintained under compression. The coil spring 162 is so constructed and arranged with respect to the trigger 150 and the lever 156 as to bias the shiftable member 136 and the pin 132, carried thereby, toward either its fully extended or fully retracted position, depending upon the position of the trigger 150. In other words, the force of compression of the spring 162 urges the trigger 150 and the lever 156 in opposite directions of rotation, the movement of the trigger 150 in opposite directions being limited by contact with opposite ends of the slot in the cover plate 148 and movement of the lever 156 in opposite directions being limited by the member 136 striking cover plate 148 at one end and the body at the bottom of the recess 137 at the opposite end.

When the outer end of the trigger 150 is in its lowermost position, illustrated in full lines in Fig. 5, the end of the spring 162 attached thereto, is disposed above a line defined by the axis of the pivot provided by the bolt 152 and the point of attachment of the other end of the spring 162 to the lever 156. When the parts of the control apparatus 146 are disposed in the foregoing relative position, the compression of the spring tends to rotate the lever 156 in a clockwise direction, as viewed in Fig. 5, and the lips 158 normally urge the shiftable member 136 and pin 132 downwardly, as viewed in Fig. 6, thereby bringing the pin 132 into an operative position.

When the outer end of the trigger 150 is moved to its upper position, shown in Fig. 9, the point at which one end of the spring 162 is attached to the trigger 150 is located below the line defined by the pivotal axis provided by the bolt 152 and the point of attachment of the other end of the spring to the lever 156 and due to the compression of the spring, the lever is urged in a counter-clockwise direction about the axis of the bolt. Counter-clockwise rotation of the lever 156 retracts the pin 132 from the interior of the bore 74 and holds the latter in its retracted position illustrated in Fig. 7.

The only manual effort required in moving the pin 132 from one position to another is that necessary to cause sufficient movement of the trigger 150 to bring the end of the spring 162 attached thereto a slight distance beyond one or the other side of the dead-center line defined by the axis of the lever 156 and the location at which the opposite end of the spring is attached thereto.

In the form of the invention illustrated in Figs. 10 to 14, inclusive, the actuating mechanism is identical in many respects to that shown in the form of the invention illustrated in Figs. 1 to 9, inclusive, and identical parts are correspondingly designated by the same numerals. This is particularly true of the snap acting control apparatus which is identical in substantially every respect to that defined. In this form of invention, the windshield wiping blade 54 is oscillated throughout a predetermined range, preferably somewhat less than 180 degrees. And for the purpose of parking the blade, it is moved to a position beyond one of the limits of its normal range of movement in order to bring the blade to position unobstructing to the vision of the operator.

In this form of the invention, the drive shaft 88' is provided, having oppositely helix threads between which correspondingly oppositely helix grooves 102' and 104' are provided. The left end portions of the threads 102' and 104', as viewed in Fig. 13, are constructed, arranged and connected together in such a manner as to reverse the direction of movement of the follower 106 when the latter reaches the left end of the threaded portion of the drive shaft 88'. Formed at the right end of the threaded portion of the drive shaft 88', as viewed in Figs. 13 and 14, is a continuous groove 116' which is disposed in a plane substantially normal to the axis of the driving shaft. When it is desired to park the wiper blade 54, the prongs 108 of the follower 106 are permitted to enter the groove 116' so as to allow continued rotation of the driving shaft 88' while the follower 106 remains at rest.

Provided in the outer end portion of the cylindrical bore 74' of the body portion 56' of the head 46' is releasable means for not only preventing access of the prongs 108 of the follower to the groove 116', but for also preventing access of such prongs to the last turn of the groove 102' or any selected portion or number of turns thereof. This mechanism includes a plunger 118' shiftably mounted in the cylindrical bore 74' for axial movement with respect thereto and with respect to the drive shaft 88'. The plunger 118' has an integral pilot member 120' slidably mounted in an aperture in a plug 124 which is fitted in the open end of the cylindrical bore 74'. Formed on the inner side of the plunger 118' are relatively long and short projections 164 and 166, respectively, both of which extend through and are slidably mounted in apertures of a flange 128' provided on the outer end portion of the drive shaft 88'. The long projection 164 has an inclined extremity 168 and it extends through the groove 116' and the adjacent turn of the groove 102' so as to deflect the follower 106 into the adjacent turn of the helical groove 104' and reverse its direction of movement without permitting the follower to traverse the last turn of the groove 102' and gain access to the continuous groove 116'. In this manner, the long projection 164 releasably establishes one of the normal operating limits of the follower and wiper blade.

When the pin 132 of the control mechanism is retracted from the interior of the cylindrical bore 74' in the foregoing manner by the snap acting control apparatus 146, the plunger 118' is free to be moved to the right, as viewed in Fig. 11, by engagement of the leading prong 108 of the follower with the inclined extremity 168 of the long projection 164. This rightward movement of the long projection 164 accommodates the passage of the follower into the turn of the helical groove 102' adjacent the continuous groove 116' and ultimately into the latter groove. The short pin 166, which is arcuately spaced from the long pin 164, is also moved to the right during rightward movement of the plunger 118' and withdrawn from the path of the follower as the latter proceeds into the continuous groove 116'.

Leftward movement of the plunger 118' is brought about in the manner set forth in the dicussion of the form of the invention illustrated in Figs. 1 to 9, inclusive, the pin 132 being receivable in a recess 138' formed in the right extremity of the plunger 118'. This recess is provided with a cam face 140' and it is so located with respect to the projections 164 and 166 that, at the instant the pin 132 is received in the recess, the small projection 166 will be located slightly in advance of the leading prong 108 of the follower, as illustrated in Fig. 16. The small projection 166 starts the follower into the first turn of the helix groove 104' by which it is carried to the left, as viewed in Fig. 13. At this time the long projection 164 is travelling between the ends of the follower so that by the time it is fully inserted, the follower is wholly in the second groove 104' from the right end of the drive shaft 88'. So long as the plunger 118' and the projections 164 and 166 thereof remain in the position shown in full line in Figs. 11, 13 and 14, the follower 106 continues to reciprocate between the limit established by the left ends of the grooves 102' and 104' and the limit established by the long projection 164. The wiper blade 54, which is operatively connected with the follower in the manner illustrated in the first described form of the invention, is accordingly oscillated between its normal limits. When the plunger 118' is moved to its right hand position, shown in dotted lines in Fig. 13, the follower 106 is permitted to move beyond its normal right limits and the wiper blade is accordingly oscillated beyond one of its normal limits to a parked position.

The releasable limit establishing means is moved into and out of operative position by the driving force of the driving shaft 88' and this servo action of the mechanism relieves the operator of all manual effort, with the exception of that required to acutate the snap acting control apparatus.

In windshield wiping apparatus embodying the invention, the actuating mechanism by which oscillative movement is imparted to a wiping blade from a rotative drive shaft, and the control mechanism therefor, is self-contained in a unitary and compact head which is detachably securable as a unit to a windshield frame or other associated windshield structure.

Although but several specific embodiments of the invention have been illustrated and described in detail, it will be apparent to those skilled in the art that various modifications may be made without departing from the scope of the appended claims.

I claim:

1. A power transmission mechanism including an oscillatably mounted member, means for oscillating said member including a reciprocable driven member operatively connected with said oscillatable member, a unidirectionally rotative driving member operatively connected with said driven member for reciprocating the latter between predetermined limits, and means associated with said driving member for establishing said limits, one of said limit establishing means being shiftable for interrupting the driving connection between said driving and driven members when the oscillatable member is in a predetermined position, and selectively operable means for controlling the shifting of said one limit establishing means to thereby effect said interruption.

2. A mechanically driven windshield wiper mechanism including an oscillatably mounted member, means for oscillating said member including a reciprocable driven member operably connected with said member, a unidirectional driving member operably connected with said driven member for normally reciprocating the latter and oscillating said first mentioned member between predetermined limits, shiftable means associated with said driving member for releasably establishing one of said limits and movable to a retracted position for accommodating movement of said driven member by said driving member to a position beyond one limit of its normal range, and a control device for controlling said movement of said shiftable means.

3. A power transmission mechanism including an oscillatable shaft, a rotary driving shaft having oppositely helixed threads, mechanism operatively connecting said shafts for oscillating said oscillatable shaft including a follower meshed with the threads of said driving shaft and drivingly connected with said oscillatable shaft, said threads being so constructed and arranged at one end of said driving shaft as to reverse the direction of movement of said follower when the latter reaches said end of said driving shaft, said shaft having a continuous groove at the other ends of said threads for accommodating rotation of said driving shaft while said follower is at rest and said oscillatable shaft is adjacent one limit of its range of movement, and releasable mechanism for reversing the movement of said follower at the latter ends of said threads, said releasable mechanism being movable when released between operative and inoperative positions by the driving force of said rotary driving shaft.

4. A power transmission mechanism including an oscillatable shaft, a rotary driving shaft having oppositely helixed threads, mechanism operatively connecting said shafts for oscillating said oscillatable shaft including a follower meshed with the threads of said driving shaft and drivingly connected with said oscillatable shaft, said threads being so constructed and arranged at one end of said driving shaft as to reverse the direction of movement of said follower when the latter reaches said end of said driving shaft, said shaft having a continuous groove at the other ends of said threads for accommodating rotation of said driving shaft while said follower is at rest and said oscillatable shaft is adjacent one limit of its range of movement, releasable mechanism for reversing the movement of said follower at the latter ends of said threads, said releasable mechanism being movable to operative and inoperative positions by the driving force of said rotary driving shaft, and a snap acting manually operable member for controlling the application of the driving force of said driving shaft to said releasable mechanism.

5. In mechanically operable power transmitting apparatus, a reciprocable driven member, a rotary driving shaft having oppositely helixed threads, mechanism operatively connecting said shaft and said driven member for reciprocating the latter including a follower meshed with said threads and drivingly connected with said reciprocable member, said threads being so constructed and arranged at one end of said driving shaft as to reverse the direction of movement of said follower when the latter reaches said end of said driving shaft, said shaft having a continuous groove at the other ends of said threads for accommodating rotation of said driving shaft while said follower is at rest, and releasable mechanism positioned to selectively reverse the movement of said follower in advance of said groove.

6. In mechanically driven power transmitting apparatus, an oscillatable driven member, means for oscillating said member including a reciprocable member drivingly connected therewith, a rotary driving shaft having oppositely helixed threads, mechanism operatively connecting said shaft and said driven member for oscillating the latter including a follower meshed with said threads and drivingly connected with said reciprocable member, said threads being so constructed and arranged at one end of said driving shaft as to reverse the direction of movement of said follower when the latter reaches said end of said driving shaft, said shaft having a continuous groove at the other ends of said threads for accommodating rotation of said driving shaft while said follower is at rest, and releasable mechanism positioned to selectively reverse the movement of said follower in advance of said groove.

7. A windshield wiper mechanism including a rotatable driving member, a driven member, means drivingly connecting the driven member to the driving member so that the driven member is reciprocated between predetermined limits, said connecting means including a shiftable element adapted when in one position to control the connecting means so as to reverse the movement of the driven member when it reaches one of the limits, said shiftable element being adapted to be shifted to a second position in which it is ineffective to cause said reversal, and a stop control device for controlling the shifting of said shiftable element.

8. A windshield wiper mechanism including a rotatable driving member, a driven member, means drivingly connecting the driven member to the driving member so that the driven member is reciprocated between predetermined limits, said connecting means including a shiftable element adapted when in one position to control the connecting means so as to reverse the movement of the driven member when it reaches one of the limits, and means including a control device engageable with said shiftable element and actuable to effect movement of said shiftable element to said position.

9. A power transmission mechanism comprising in combination, a drive member, a driven member actuable by said drive member, a housing for receiving said members, means within said housing for connecting said drive member to said driven member, and for causing operation of said drive member to move said driven member back and forth between predetermined limits relative to said housing, said means including an element movable between a first position in which it establishes one of said limits and a second position in which it permits said drive member to move said driven member to a position beyond one of said limits, and means to control movement of said element between said first and second positions.

10. A power transmission mechanism comprising in combination, a unidirectionally operable drive member, a driven member actuable by said drive member, means for connecting said driven member to said drive member so that operation of said drive member causes said driven member to move back and forth between predetermined limits, and a control device operable during the operation of said mechanism to adjust certain of said reversing means so as to render said certain of said reversing means ineffective to reverse said driven member at one of said limits.

FRANK KRITZ.